J. DESMOND.
PUMPING DEVICE.
APPLICATION FILED OCT. 31, 1910.
1,007,275.
Patented Oct. 31, 1911.
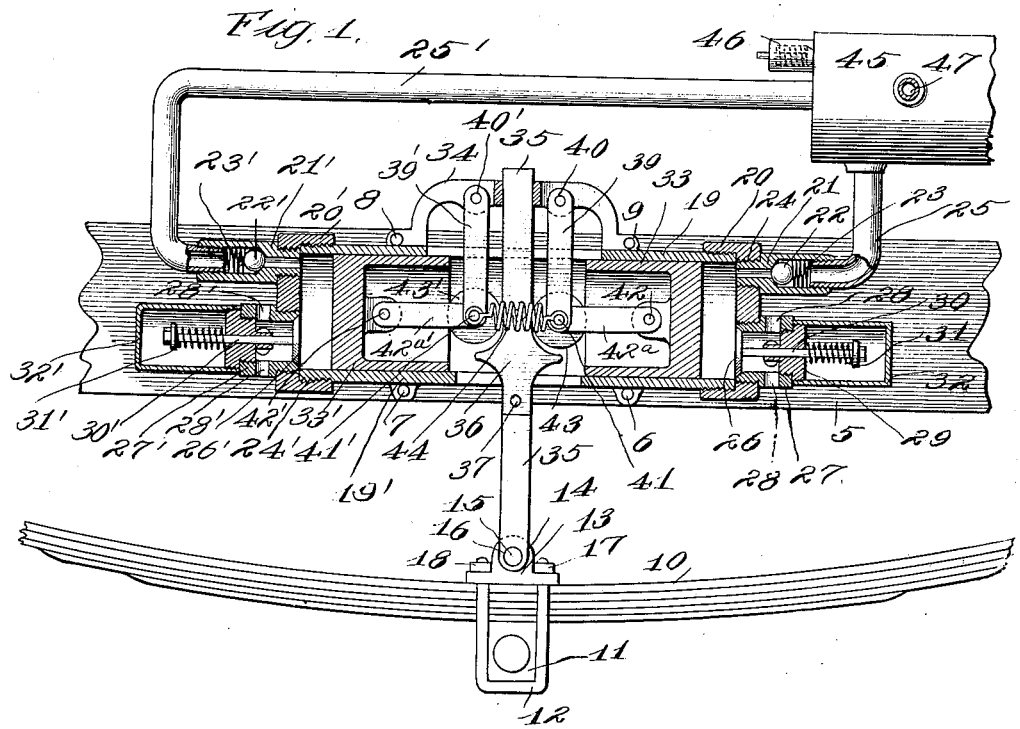
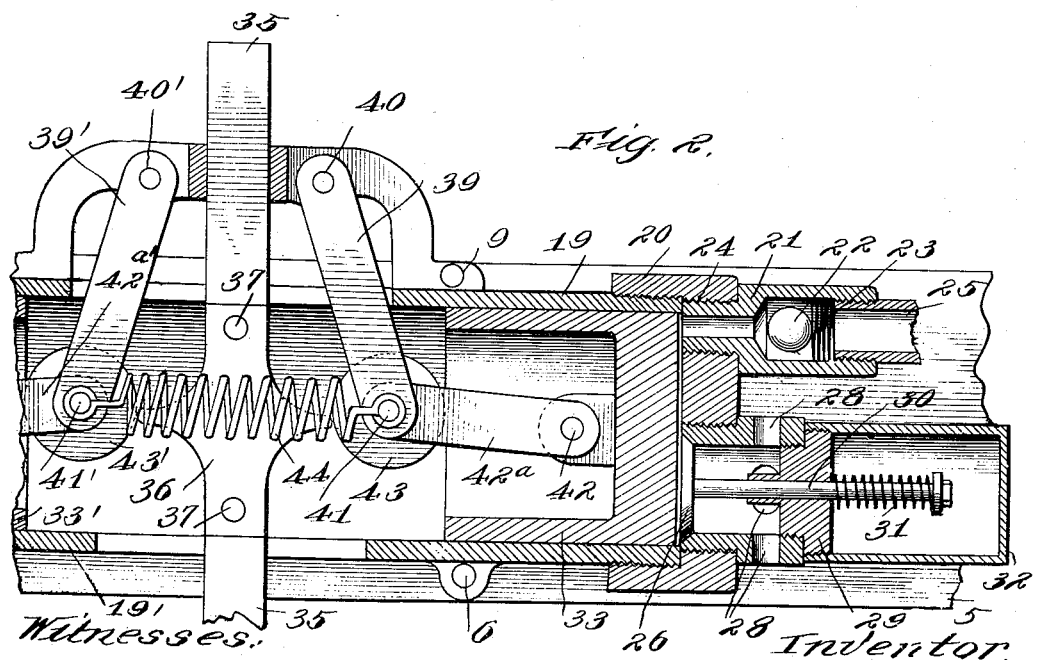
Witnesses:
Inventor:
John Desmond,
By Toric Bain and May, Attys.

UNITED STATES PATENT OFFICE.

JOHN DESMOND, OF CHICAGO, ILLINOIS, ASSIGNOR TO WILLIAM S. POTWIN, OF CHICAGO, ILLINOIS.

PUMPING DEVICE.

1,007,275.  Specification of Letters Patent.  Patented Oct. 31, 1911.

Application filed October 31, 1910. Serial No. 589,840.

*To all whom it may concern:*

Be it known that I, JOHN DESMOND, a citizen of the United States, residing at Chicago, in the county of Cook and State of Illinois, have invented certain new and useful Improvements in Pumping Devices, of which the following is a specification.

My invention relates to improvements in pumping devices, and has for one of its objects to provide a pumping device adapted to be operated by the relative vertical vibration of the body of a moving vehicle, and its running gear.

Another object of my invention is to provide a pumping device associated with the vehicle in such a manner that the relative vertical vibration of the body of the vehicle is utilized to operate the pumping instrumentality and the cushioning effect of the pumping device operates as a shock absorber, and prevents undue too-rapid and violent vibratory movements of the said body.

Other and further objects of my invention will readily become apparent to persons skilled in the art from a consideration of the specification taken in conjunction with the drawings, wherein—

Figure 1 is a central longitudinal section of the device; Fig. 2 is an enlarged similar fragmentary view, showing the parts in relatively different positions.

My device may be advantageously used in connection with an automobile for the purpose of pumping air into a reservoir from which the air so compressed may be used for the purpose of starting the engine, or for any other purpose for which such compressed air may be used. The device may also be employed as a circulating pump for the purpose of giving motion to and circulating the cooling water used in cooling the cylinders of an internal combustion engine. Other purposes for which the pumping instrumentality may be economically and efficiently used will become readily apparent.

5 is the frame of an automobile to which the device may be secured by bolts taking through perforations 6, 7, 8, and 9.

10 is the spring of an atuomobile, secured to the axle of the running gear by means of the yoke 12, the latter passing through a clip, 13, provided with projections 14, having a perforation 15 for a bolt 16. The clip is held in place by means of the nuts 17 and 18.

In the operation of an automobile, there is a relative vertical movement between the axle 11 and the frame 5. It is this vertical movement which I utilize for operating my pumping device.

The pump, which I have illustrated, is a double cylinder device, one side being an exact duplicate of the other, and I will therefore indicate one side by reference characters, and mark the corresponding parts of the other side by the same characters differentiated by exponent prime (').

19 is a cylinder provided with a cap 20 in the end of which is a spring-pressed check valve, 21, provided with a ball seat and valve, 22, normally held upon the valve seat by a spring, 23. The check valve 21 is secured in the head of the cap by a screw-threaded extension, 24, and is connected to a pipe 25. An intake valve, 26, is provided with a casing, 27, having intake perforations 28. In the end of the casing 27 is a valve-stem guide, 29. Surrounding the valve stem 30 of the valve 26 is a spring 31 which normally holds the valve on its seat. Over the end of the valve stem I place a cap, 32, to protect the valve stem and to prevent the entrance of dust. A piston 33 moves freely in the cylinder 19.

A bridge piece 34 is connected near the middle part between the cylinders to the structure, and is provided with a central guide, for a vertically moving, preferably flat, rod, 35, the lower end of which is pivotally connected by bolt 16 to the clip 14. The rod 35 carries an enlargement, 36, secured by means of bolts 37. The enlargement 36 may be removed from the rod, 35, by taking out said bolts. Depending from the bridge piece, 34, are links 39—39', pivoted, as at 40, and pivotally connected at their ends to studs 41—41'. Links 42ª and 42ª' are pivotally connected to the studs 41—41', and also the pistons as at 42—42'. The wheels 43 are in the same plane with the lateral extension, piston-operating means, 36, so that when the rod 35 is moved past the axes of the wheels 43—43', the pistons 33—33' are moved into the cylinder simultaneously. Spring, 44, connects the studs 41—41', together, and holds the wheels, 43—43', in substantial contact with the vertical bar, 35.

When the vehicle is empty, the parts are preferably in the positions substantially as shown in Fig. 1; as it becomes loaded, the frame 5 is depressed until it occupies a position nearer the axle 11 and the parts are in the substantial positions shown in Fig. 2. Now, any relative vibration of the body, with reference to the axle, as by rough road or other obstructions, causes the lateral extension means, 36, to pass beyond the axes of the wheels 43—43', and produces a reciprocation of the pistons 33—33' whereby the device exercises its pumping function. When the extension part 36 rises above the axes of the wheels 43—43', due to excessive vibration, the springs 44 draw the studs 41—41' closer together and the respective associated pistons, unseating the valves 26—26', and permitting air or other fluid to enter the cylinders through the intake valve, at the same time closing the discharge valves 21—21' by balls 22—22' and springs 23—23' assisted by the vacuum tendency in the cylinders; the same action follows when the part 36 passes below the plane of the axes of the said wheels 36—36'. When the part 36 is moved from the position shown in Fig. 1 to the position shown in Fig. 2, the contents of the cylinders is forcibly ejected into pipes 25—25' into a receptacle such as a tank, 45, similarly arranged to contain air under pressure, as when the device is employed for compressing air.

46 is a safety valve that may be set to "blow off" at any desired pressure, so that the continued use of the pump, when air is compressed in the otherwise closed reservoir, will not result in a rupture of the walls of the said reservoir.

47 is a pipe opening for a pipe leading to the device in which it may be desirable to use the compressed air.

Should the device be used for circulating water, as in the water circulating system of internal combustion engines a return pipe from the reservoir should be connected to the intake valve, as in all such systems. This fact being so obvious as to render an illustration thereof unnecessary.

While I have herein illustrated only a single embodiment of my invention, it will be readily understood that considerable variation may be made within the scope of the claims without departing from the spirit of my invention.

What I claim is:

1. In a device of the character described, the combination with vehicle running gear and frame elements, a cylinder and piston carried by one of said elements, and means for oscillating said piston in its cylinder comprising a member movable with the other vehicle element, a roller associated with said piston, a cam enlargement upon said movable member providing a central apex and rapidly descending curved sides, and a spring holding said roller in coöperation with said cam enlargement, whereby relative vertical vibration of said vehicle elements causes said roller to play from side to side of said central apex to oscillate the piston in said cylinder.

2. In a device of the character described, the combination with vehicle running gear and frame elements, of a cylinder and piston carried by one of said elements, and means for oscillating said piston in its cylinder comprising a member movable with the other vehicle element, an enlargement on said movable member providing a central apex and tapering guiding surfaces descending on both sides of said central apex, a piston rod pivotally connected to said piston, a roller mounted upon the free end of said piston rod, and means for yieldingly holding said roller in position to coöperate with said cam enlargement, whereby vertical movement of one of said vehicle elements with respect to the other causes said roller to play from side to side of said cam enlargement in opposition to said yielding means, to oscillate said piston in its cylinder.

3. In a device of the character described, a vehicle comprising two elements, a frame and a running gear with springs interposed, a double acting piston pump comprising a cylinder connected to one of said elements, pistons in each end of said cylinder, a support to which vertically disposed pivoted links are attached, laterally disposed links pivotally attached to the respective pistons, and said vertical links, studs taking through said links respectively, wheels relatively supported on said studs, springs connected to the ends of said studs, and to opposite studs to draw them toward each other, a vertically movable rod connected to the other of said elements, interposed between said wheels, and carrying a laterally enlarged part in the plane of said wheels whereby said pistons are reciprocated in one direction by the relative movement of said elements and in the other direction by the springs to operate the pump.

In testimony whereof I hereunto set my hand in the presence of two witnesses:

JOHN DESMOND.

In the presence of—
 FRED W. GOODMAN,
 EMILIE MOYE.